United States Patent [19]

Lupke

[11] Patent Number: 5,531,585
[45] Date of Patent: Jul. 2, 1996

[54] TRAVELLING MOLD WITH SEPARATION OF MOLD BLOCKS

[76] Inventor: Manfred A. A. Lupke, 92 Elgin Street, Thornhill, Ontario, Canada, L3Y 1W6

[21] Appl. No.: 239,124

[22] Filed: May 6, 1994

[51] Int. Cl.[6] .......................... B29C 44/28; B29C 33/36
[52] U.S. Cl. ..................... 425/233; 264/210.1; 264/508;
 264/564; 264/568; 425/326.1; 425/335;
 425/336; 425/363; 425/370; 425/387.1;
 425/388; 425/396; 425/453
[58] Field of Search ............................... 425/145, 326.1,
 425/335, 336, 364 B, 453, 233, 363, 370,
 387.1, 388, 396; 264/508, 515, 566, 210.1,
 564, 568

[56] References Cited

U.S. PATENT DOCUMENTS

| 4,212,618 | 7/1980 | Hegler et al. ........................ 425/326.1 |
| 4,787,598 | 11/1988 | Rahn et al. ............................. 425/335 |

FOREIGN PATENT DOCUMENTS

| 0005104 | 10/1979 | European Pat. Off. . |
| 0270694 | 6/1988 | European Pat. Off. . |
| 0621120 | 10/1994 | European Pat. Off. . |
| 2210022 | 7/1974 | France . |
| 02134227 | 5/1990 | Japan . |
| 91/06419 | 5/1991 | WIPO . |
| 9407673 | 4/1994 | WIPO . |

Primary Examiner—Jay H. Woo
Assistant Examiner—Joseph Leyson

[57] ABSTRACT

A travelling mold has mold block sections which are driven around an endless track. The mold has a drive system including a first drive component which drives the mold block sections in abutting positions with one another to a second component in the drive system which accelerates and separates the mold block sections and which then decelerates and regroups the mold block sections in their abutting positions before the mold block sections are returned to the first drive component. This separation and regrouping of the mold block sections eliminates the necessity of having a complete chain of abutting mold block sections completely around the mold.

6 Claims, 4 Drawing Sheets 5,531,585

TRAVELLING MOLD WITH SEPARATION OF MOLD BLOCKS

FIELD OF THE INVENTION

The present invention relates to a travelling mold having a drive system which provides for separation of the mold block sections over part of the length of the endless track in which the mold block sections travel.

BACKGROUND OF THE INVENTION

A travelling mold for the manufacturing of ribbed pipe and the like uses mold block sections having a sophisticated construction required for the accurate formation of the pipe. Specific pipe grooves must be provided in the mold block sections to shape the ribbing on the pipe and air channels must be provided in order to move the plastic material forming the pipe through either positive or negative pressure into the grooves.

As a result of the detailing required in the mold block sections, they are expensive to manufacture. Furthermore, a conventional travelling mold requires an endless chain of side by side mold block sections completely around the mold.

There are benefits to increasing the size of a travelling mold. For example, a longer travelling mold has a longer molding tunnel enabling higher pipe production. In addition, extending the length of the mold also increases the mold base producing a steadier mold. However, from a negative standpoint, when working with a conventional mold, there is a substantial cost increase incurred for the additional mold block sections required as a result of the increased length of the mold.

SUMMARY OF THE INVENTION

The present invention provides a traveling mold having mold block sections which are driven around an endless track. The mold has a drive system including a first drive component which drives the system mold block sections in abutting positions as they travel in the mold tunnel to a second component in the drive system which accelerates and separates the mold block sections and which then decelerates and regroups the mold block sections in their abutting positions before the mold block sections are returned to the first drive component.

In accordance with the present invention, the mold block sections are not maintained side by side with one another completely around the length of the mold track, but rather large gaps are provided between the mold block sections in certain regions of the track. Therefore a mold built in accordance with the present invention uses fewer mold block sections with considerable cost saving in comparison to the same length mold built using side by side mold sections completely around the mold as found in the prior art construction.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION

Figure 1:
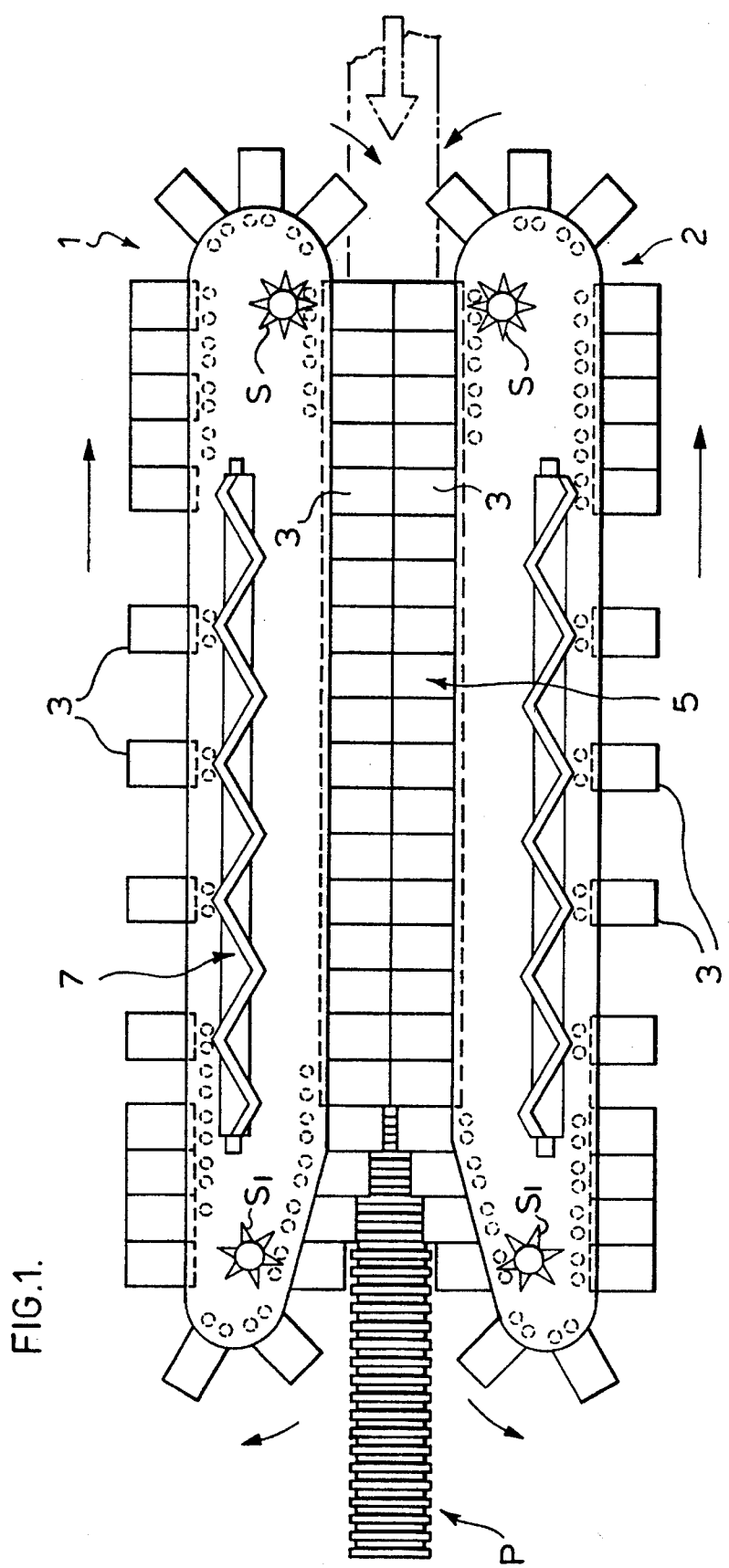
FIG. 1 is a side view of a travelling mold made in accordance with a preferred embodiment of the present invention.

FIG. 1 shows a travelling mold comprising an upper mold loop generally indicated at 1 and a lower mold loop generally indicated at 2. Each of these mold loops is formed with a plurality of mold block sections 3 which travel continuously within a track around each of the loops. With the conventional travelling mold, the mold block sections would be bunched tightly up against one another completely around each of the loops. However, this is not the case in accordance with the present invention for reasons described below.

The travelling mold shown in FIG. 1 includes a mold tunnel or channel generally indicated at 5. This is the area of the mold in which the mold block sections from loop 1 close with the mold block sections from the loop 2 to provide a tunnel or channel for the production of plastic pipe P. After the pipe is formed, the mold block sections in each of the loops release or open from one another as they travel outwardly around the end of the loop.

As each set of facing mold block sections from the loops 1 and 2 enter the mold tunnel 5, they are picked up by a drive gear in the form of a sprocket S. This sprocket, which is positively driven by a motor, pushes the individual mold block sections into the tunnel. As each mold block section leaves the sprocket, the next upstream mold block section is then picked up by the sprocket and pushes the side by side abutting downstream mold block sections through the tunnel. Accordingly, only one positively driven sprocket is required at the upstream end of the tunnel.

After the mold block sections leave the end of the tunnel, they pass over a second sprocket S1. Sprocket S1 is not motor driven but rather is turned by the mold block sections which are pushed by the upstream sprocket S and therefore merely acts as a guide for guiding the mold block sections around the end of the track or loop in which they travel.

As can be clearly seen in FIG. 1, as the mold block sections leave the tunnel, the mold block sections in the upper loop, separate from the mold block sections in the lower loop to release the now formed pipe P.

Figure 2:
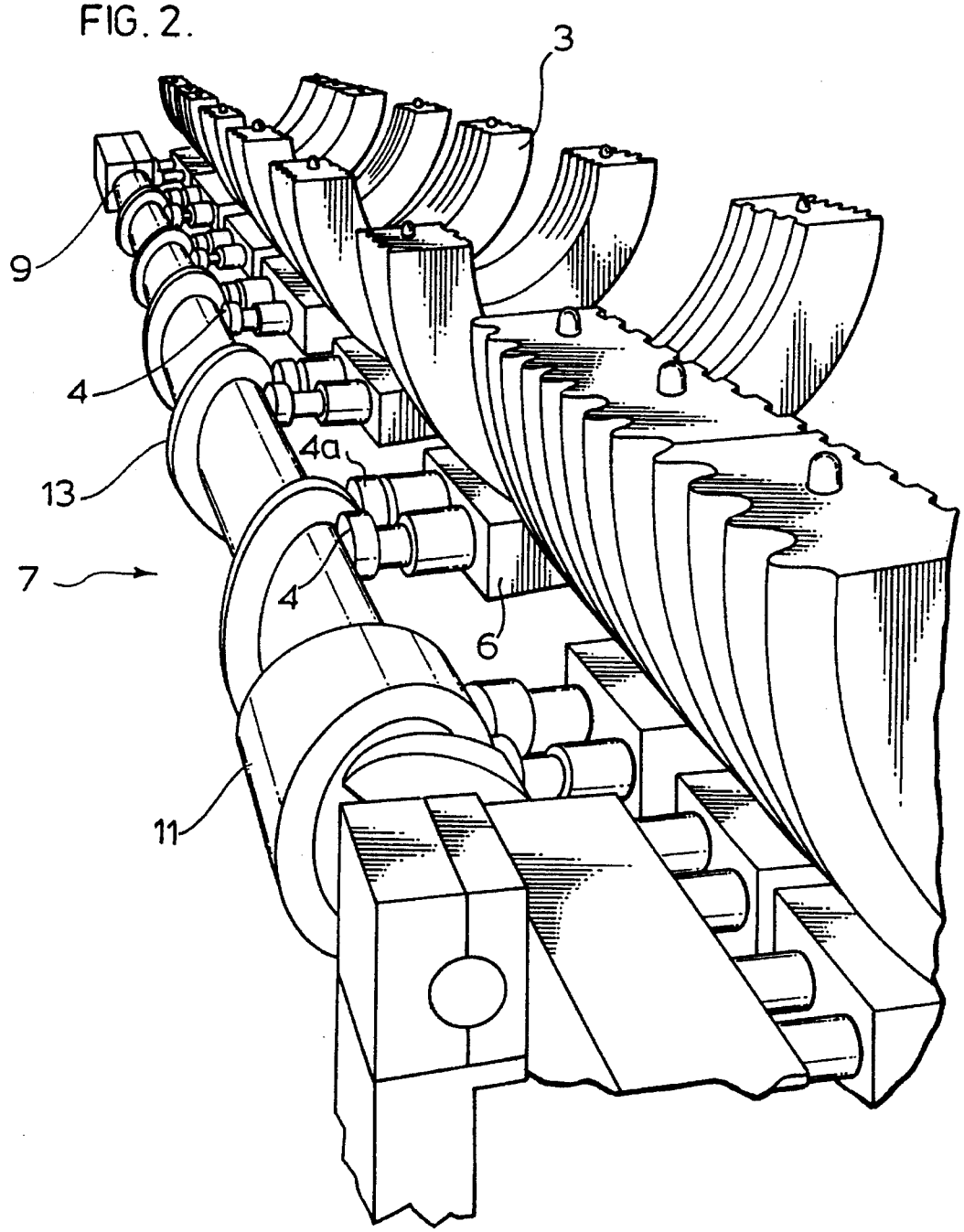
FIG. 2 is a perspective view of an upper region along one side of the mold of FIG. 1.
Figure 3:
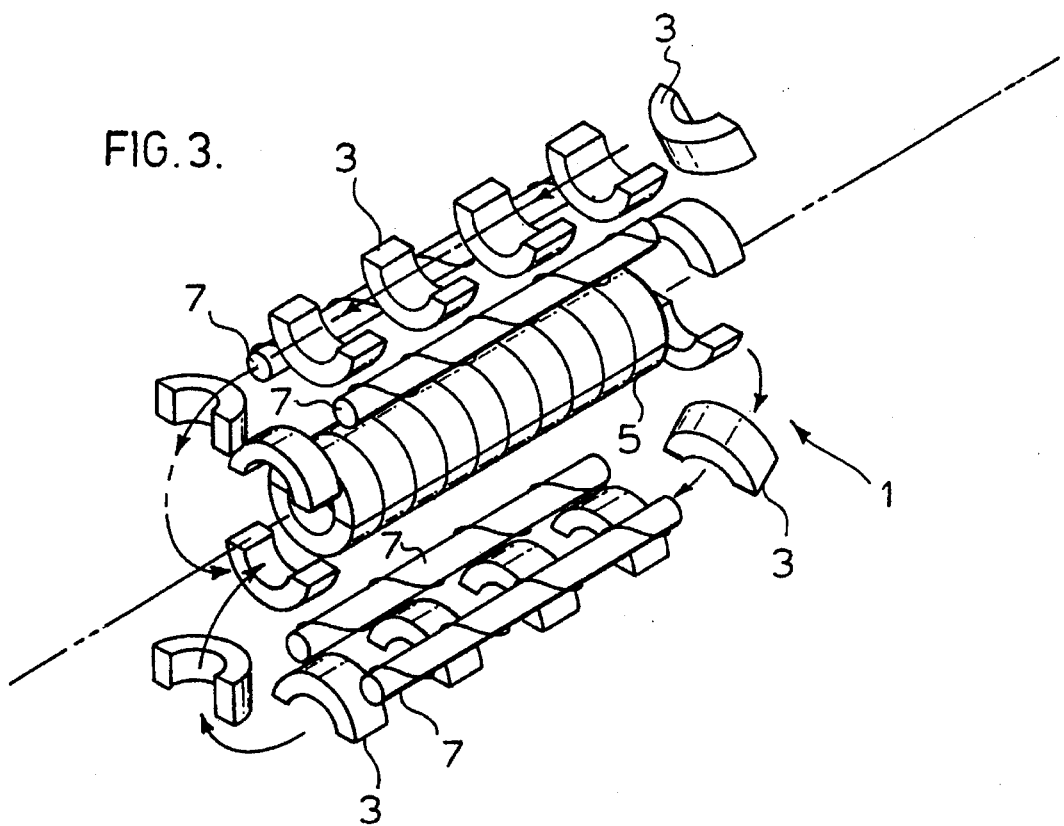
FIG. 3 is a schematic view showing operation of the mold of FIG. 1.

After the mold block sections pass the downstream sprocket S1 and round the corner on their respective mold loops, they move along the return path of the loop. This return path is the upper reach along the upper loop and the lower reach along the lower loop. Each return path is provided with a further component of the drive system in the form of a pair of augers 7 at both the upper and lower loops of the travelling mold. FIG. 2 shows one of the augers 7 to one side of the mold block sections while FIG. 3 shows both of the augers to each side of the mold block sections at both the upper and lower loops of the travelling mold.

Augers 7 like sprockets S1 are not motor driven but rather are operated by the action of the mold block sections being pushed onto them. As best seen in FIG. 2 of the drawings, each mold block section 3 is provided with a pair of guides 4 and 4a extending out to the side of the carrier 6 on which each mold block section is mounted. Although FIG. 2 only shows one side of the carrier 6, it is to be understood that the opposite side of the carrier has the same construction as that shown in FIG. 2, i.e. guides 4 and 4a are provided to both sides of the carrier.

The guides 4 and 4a on the carrier 6 are slightly gapped from one another providing a tooth grip opening between the guides for the teeth on sprockets S and S1 when the mold block sections are moved through the mold tunnel. In addition, the guides 4 and 4a cooperate with the augers 7 in moving the mold block sections along the length of the auger.

More particularly, each of the augers 7 is provided with a helical thread 13. Thread 13 is relatively tightly wound at both the upstream end 9 and the downstream end 11 of the auger. The thread has a much greater spreading or separation of the thread over the main center part of the auger.

It is imperative that the change from the tighter to the wider winding of the thread at the upstream end of the auger match the change from the wider winding back to the tighter winding at the downstream end of the auger. The reason for this feature is that the auger must rotate at a constant speed at all times during its operation so that mold block sections coming off the upstream end of the auger do not affect its positioning or angle of rotation to receive mold block sections being pushed onto the auger. In other words, the mold block sections pushed onto the upstream end of the auger cannot hinder the mold block sections leaving the downstream end of the auger and vice-versa.

If the auger winding was not matched at the upstream and downstream ends of the auger then it would jamb and interrupt movement of all of the mold block sections around the loop.

It should also be noted that the augers for the upper loop must match the augers for the lower loop so that the mold block sections in both loops remain synchronized with one another.

As the mold block sections are pushed onto the auger, the guide rollers 4 and 4a are picked up by the auger thread and fed along the auger. The opening of the thread winding causes the mold block sections to initially accelerate and as they reach the more widely spread winding on the thread, they move across the auger at a substantially greater speed than any of the mold block sections which are not carried by the auger. Therefore, the mold block sections moving in the opposite direction through the mold tunnel move at a much slower speed than the mold block sections which travel across the auger.

As the thread on the auger begins to close or tighten near the downstream end of the auger, the mold block sections are slowed down to the speed at which they initially entered the auger and they are again placed side by side with one another where each mold block section forces the adjacent downstream mold block section to return to the drive sprocket S at the upstream end of the mold tunnel. Therefore, the sprocket drives the mold block sections completely around the mold and back onto itself.

As clearly shown in the drawings the travelling mold of the present invention eliminates the requirement to have mold block sections maintained in side by side relationship completely around the mold. In the present invention, there are substantial gaps between the mold block sections along at least the return path of each loop. Furthermore, under certain conditions, it may be desirable to separate the mold block sections from one another in other parts of the loop including through specified regions of the mold tunnel itself.

In accordance with the present invention, a travelling mold can either be made longer with the resultant benefits from its increased length using the same number of mold blocks or mold block sections as found in a much shorter mold. In the alternative, if the mold length is not increased, then fewer mold blocks can be used. In both cases, there are substantial cost savings.

FIG. 3 of the drawings shows in perspective sets of augers 7 provided both above and below the mold tunnel. This figure is therefore representative of mold shown in FIGS. 1 and 2 of the drawings.

Figure 4:
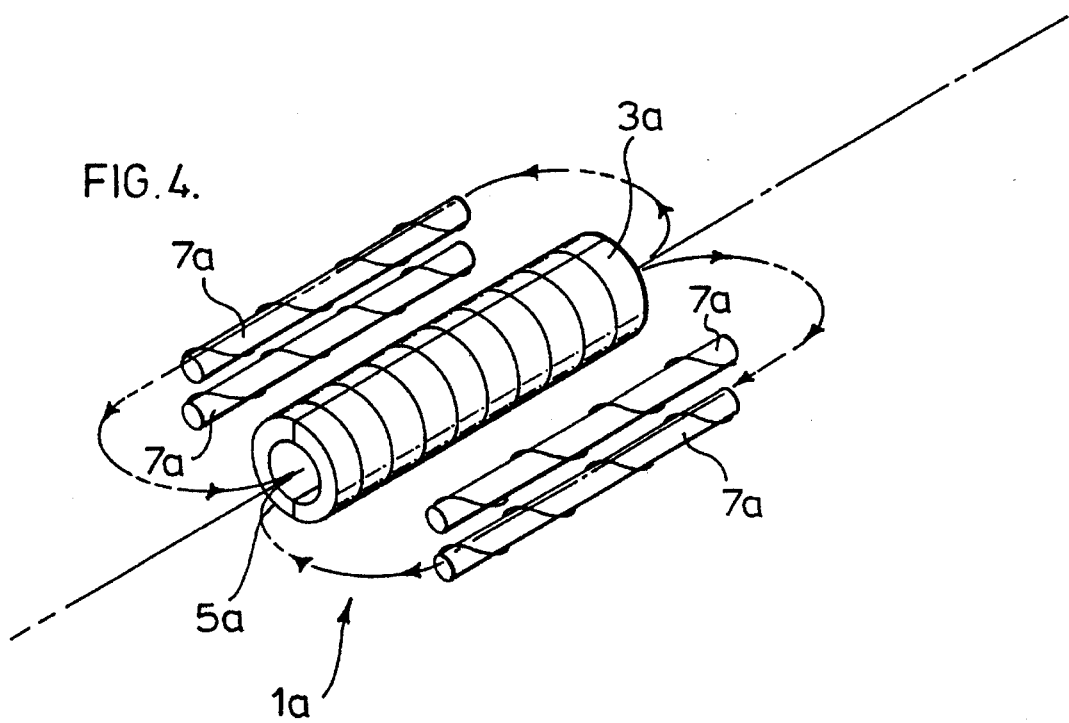
FIG. 4 is a further schematic view of a part of a travelling mold according to another preferred embodiment of the invention.

FIG. 4 shows features from a mold generally indicated at 1a including mold blocks 3a which pass along a mold tunnel 5a. The mold blocks in the return path of the loop are not shown in FIG. 4. However, what is to be noted in FIG. 4 is the provision of pairs of augers 7a to opposite sides of the mold tunnel rather than above and below the mold tunnel as shown in FIG. 3. Accordingly, the concept of accelerating and separating mold block sections along the return path of a mold loop is equally applicable to mold which operates with loops rotating in a horizontal direction.

Figure 5:
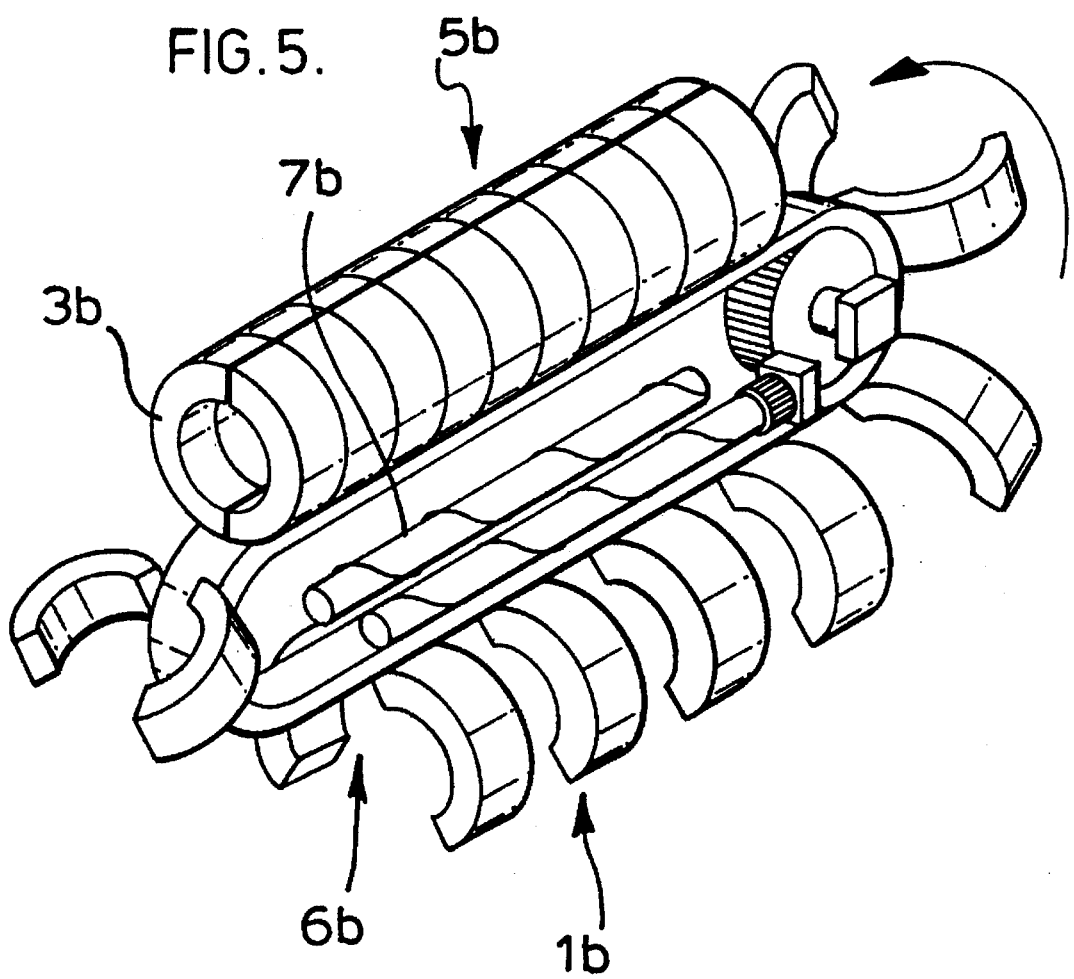
FIG. 5 is a perspective view of a travelling mold in accordance with still a further preferred embodiment of the present invention.

FIG. 5 again shows a modification of the present invention used with a travelling mold generally indicated at 1b. This mold is different in that the mold block sections 3b are all contained within a single loop. These mold block sections which hinge relative to one another are through the mold tunnel region 5b of the mold and are opened along the return path 6b of the mold. A pair of augers 7b are provided along this return path and provide for acceleration, separation and then deceleration of the mold blocks before they are returned to the mold tunnel in the same manner as that described with respect to the earlier embodiments. Therefore, although the bulk of the description above relates to multiple track molds, it will be clearly seen in FIG. 5 that the same concept is equally applicable to a single track travelling mold.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A travelling mold having mold block sections which are driven around at least one endless track, said mold having a drive system including a first drive component which drives the mold block sections in abutting positions with one another to a second component comprising auger means in said drive system, said auger means accelerating and separating said mold block sections and then decelerating and regrouping said mold block sections side by side with one another before returning said mold block sections to said first drive component.

2. A travelling mold as claimed in claim 1 wherein said mold block sections include a first set of mold block sections and a second set of mold block sections and said at least one endless track includes a first endless track on which said first mold block sections are mounted and a second endless track on which said second mold block sections are mounted, said first drive component driving said mold block sections to form a mold tunnel in which said first set of mold block sections meet with said second set of mold block sections, each of said first and second tracks having a return path away from said mold tunnel and the return path for each of said first and second tracks being provided with said auger means having an upstream end, a downstream end and an elongated body portion between said upstream and said downstream ends of said auger means, said auger means being rotatable and having a helical thread therealong and said helical thread having a matching tight winding at said upstream and said downstream ends of said auger means with a wider winding of said thread being provided over said elongated body portion of said auger means and guide means for guiding said mold block sections lengthwise of said auger means.

3. A travelling mold as claimed in claim 2, wherein said auger means comprises a first set of spaced apart matching augers along said return path of said first track and a second set of spaced apart matching augers along said return path of said second track, said first set of augers being matched with said second set of augers.

4. A travelling mold as claimed in claim 3, wherein said mold block sections in both said first and second tracks move horizontally to and from said mold tunnel.

5. A travelling mold as claimed in claim 1, wherein all of said mold block sections are mounted in a single track.

6. A travelling mold as claimed in claim 3 wherein said augers are located above and below said mold tunnel.

\* \* \* \* \*